US010513000B2

(12) United States Patent
Mototani

(10) Patent No.: US 10,513,000 B2
(45) Date of Patent: Dec. 24, 2019

(54) MACHINE TOOL
(71) Applicant: HORKOS CORP, Hiroshima (JP)
(72) Inventor: Hiroshi Mototani, Hiroshima (JP)
(73) Assignee: HORKOS CORP, Hiroshima (JP)
( * ) Notice: Subject to any disclaimer, the term of this patent is extended or adjusted under 35 U.S.C. 154(b) by 95 days.
(21) Appl. No.: 15/560,940
(22) PCT Filed: Mar. 18, 2016
(86) PCT No.: PCT/JP2016/001612
§ 371 (c)(1),
(2) Date: Sep. 22, 2017
(87) PCT Pub. No.: WO2016/152138
PCT Pub. Date: Sep. 29, 2016
(65) Prior Publication Data
US 2018/0079044 A1 Mar. 22, 2018
(30) Foreign Application Priority Data
Mar. 23, 2015 (JP) .................................. 2015-060217
(51) Int. Cl.
*B23Q 15/22* (2006.01)
*B23Q 3/157* (2006.01)
(Continued)
(52) U.S. Cl.
CPC ......... *B23Q 15/22* (2013.01); *B23Q 3/15706* (2013.01); *B23Q 5/04* (2013.01); *B23Q 5/34* (2013.01); *B23Q 39/00* (2013.01); *G05B 19/29* (2013.01); *B23C 1/04* (2013.01); *B23Q 3/15539* (2016.11); *B23Q 3/15766* (2013.01); *B23Q 2039/002* (2013.01); *G05B 2219/34319* (2013.01); *Y10T 409/307056* (2015.01); *Y10T 409/307168* (2015.01); *Y10T 483/1795* (2015.01); *Y10T 483/1845* (2015.01)
(58) Field of Classification Search
CPC .. B23Q 39/00; B23Q 2039/002; B23Q 39/02; B23Q 15/22
See application file for complete search history.

(56) References Cited

U.S. PATENT DOCUMENTS

2003/0053875 A1 3/2003 Pasquetto
2006/0182506 A1* 8/2006 Hillinger ................ B23Q 1/282
408/53
(Continued)

FOREIGN PATENT DOCUMENTS

DE 102006035248 A1 1/2008
DE 102006035248 B4 8/2013
(Continued)

OTHER PUBLICATIONS

International Search Report issued in corresponding International Application No. PCT/JP2016/001612 dated May 24, 2016, with translation (3 pages).
(Continued)

*Primary Examiner* — Alan Snyder
(74) *Attorney, Agent, or Firm* — Osha Liang LLP

(57) ABSTRACT

A machine tool includes: a plurality of machining units, each including: a first saddle movable in a right-left direction; a second saddle supported by the first saddle and movable in an up-down direction; and a spindle device supported by the second saddle and movable in a front-rear direction. The plurality of machining units are arranged in the right-left direction such that spindles provided in the respective spindle devices are parallel to each other. The machining tool further includes an X-axis moving mechanism that moves the first saddle in the right-left direction; and a control device that controls an operation of the X-axis moving mechanism during machining of a workpiece and during correction of a spindle spacing between the machining units. A plurality of the X-axis moving mechanisms are provided corresponding to the respective machining units.

6 Claims, 11 Drawing Sheets

(51) Int. Cl.
 *B23Q 5/04* (2006.01)
 *B23Q 5/34* (2006.01)
 *B23Q 39/00* (2006.01)
 *G05B 19/29* (2006.01)
 *B23Q 3/155* (2006.01)
 *B23C 1/04* (2006.01)

(56) References Cited

U.S. PATENT DOCUMENTS

2007/0053756 A1* 3/2007 Horn ................ B23Q 1/601
 409/131
2010/0145498 A1* 6/2010 Uchikawa .......... B23Q 3/15733
 700/179

FOREIGN PATENT DOCUMENTS

| JP | H08-112738 A | 5/1996 |
| JP | 2000-066710 A | 3/2000 |
| JP | 2003-58211 A | 2/2003 |

OTHER PUBLICATIONS

Written Opinion of the International Searching Authority issued in PCT/JP2016/001612 dated May 24, 2016 (3 pages).
Extended European Search Report issued in corresponding European Patent Application No. 16768045.3 dated Dec. 14, 2018 (10 pages).

* cited by examiner

MACHINE TOOL

TECHNICAL FIELD

The present invention relates to a machine tool provided with a plurality of spindles, and particularly, to a technique for correcting a displacement in a pitch between the spindles caused by heat.

BACKGROUND ART

There is known a machine tool that includes a plurality of spindles arranged parallel to each other and simultaneously machines a plurality of workpieces with the respective spindles. In such a machine tool, a displacement occurs in a spindle spacing (a pitch between the spindles) due to a temperature change (e.g., a temperature difference between day and night) inside a factory and heat generated by the rotation of the spindles.

Further, similarly in jigs which grasp workpieces, a displacement occurs in the spacing between the jigs due to a temperature change inside the factory and contact of chips heated by machining. It is known that a displacement amount in the jigs differs from a displacement amount in the spindles because the jigs are typically made of a material different from the material of the spindles.

When such thermal displacement is left as it is, the left thermal displacement has an extremely bad influence on the workpiece machining accuracy. Thus, there has been conventionally performed fine adjustment of the spindle spacing corresponding to the relative positions with respect to the jigs in order to increase the machining accuracy. Patent Literature 1 describes a machine tool provided with a device that performs such adjustment of the spindle spacing.

FIG. 11 is a diagram illustrating a principal part of the machine tool of Patent Literature 1. Spindles 401, 501 are supported movably in the front-rear direction (the direction perpendicular to the sheet) on two machining units 400, 500, respectively. These machining units 400, 500 are coupled by a clamping device (not illustrated) and integrally movable in the right-left direction by an X-axis moving mechanism 600 installed on a bed. When the spindle spacing between the spindles 401, 501 supported on the machining units 400, 500 is corrected, a clamping state of the clamping device which couples the machining units 400, 500 is released, and the position of each of the machining units 400, 500 is corrected by a spacing correction device 700 which is separately provided. The spacing correction device 700 includes a ball screw 702 which is driven by a motor 701.

CITATIONS LIST

Patent Literature 1: DE 102006035248

In Patent Literature 1, the X-axis moving mechanism 600 which integrally moves the two machining units 400, 500 in the X-axis direction (the right-left direction in FIG. 11) is coupled to the first machining unit 400 among the two machining units 400, 500. Thus, in order to adjust the position of the second machining unit 500 to which the X-axis moving mechanism 600 is not coupled, it is necessary to couple the spacing correction device 700 to the second machining unit 500. That is, in Patent Literature 1, it is necessary to provide the spacing correction device 700 in addition to the X-axis moving mechanism 600 which moves the two machining units 400, 500 in the X-axis direction. Note that the spacing correction device 700 only has a function of adjusting the position of the second machining unit 500.

SUMMARY

A machine tool in accordance with one or more embodiments of the invention can correct a spindle spacing with a simple configuration without providing a dedicated device to correct the spindle spacing.

In one or more embodiments of the present invention, a machine tool includes a plurality of machining units, each of the machining units including: a first saddle movable in a right-left direction; a second saddle supported by the first saddle and movable in an up-down direction; and a spindle device supported by the second saddle and movable in a front-rear direction, and the plurality of machining units are arranged in the right-left direction in such a manner that spindles provided in the respective spindle devices are parallel to each other. Further, the machine tool includes an X-axis moving mechanism that moves the first saddle in the right-left direction and a control device that controls an operation of the X-axis moving mechanism during machining of a workpiece and during correction of a spindle spacing between the machining units. A plurality of the X-axis moving mechanisms are provided corresponding to the respective machining units, and the control device moves the first saddle of a predetermined one of the machining units in the right-left direction using one of the X-axis moving mechanisms corresponding to the predetermined machining unit to correct the spindle spacing during correction of a spindle spacing.

Such a configuration makes it possible to correct the spindle spacing by using the already-existing X-axis moving mechanism without providing a dedicated device to correct the spindle spacing.

In one or more embodiments of the present invention, the machine tool further includes a reference position measuring device that measures a reference position to be a reference for the correction of the spindle spacing. In this case, the control device calculates a correction amount on the basis of the reference position measured by the reference position measuring device and controls the X-axis moving mechanism so as to move the first saddle in the right-left direction by the correction amount during the correction of the spindle spacing.

In one or more embodiments of the present invention, the machine tool further includes a clamping device that couples the first saddles of adjacent two of the machining units to each other. In this case, the control device brings the clamping device into an unclamping state to release the coupling between the first saddles during the correction of the spindle spacing, and, when the correction of the spindle spacing is finished, the control device brings the clamping device into a clamping state to couple the first saddles to each other or synchronously moves the first saddles using the X-axis moving mechanisms corresponding to the respective two machining units with the clamping device maintained in the unclamping state.

In one or more embodiments of the present invention, the first saddle of one of adjacent two of the machining units may be fixed so as not to move in the right-left direction and the first saddle of the other machining unit may be moved in the right-left direction to correct the spindle spacing.

In one or more embodiments of the present invention, the machine tool includes: a Y-axis moving mechanism that moves the second saddle of each of the machining units in the up-down direction; and a Z-axis moving mechanism that moves the spindle device of each of the machining units in the front-rear direction. A plurality of the Y-axis moving mechanisms and a plurality of the Z-axis moving mechanisms are provided corresponding to the respective machining units. In this case, the control device moves the second saddle in the up-down direction using the Y-axis moving mechanism to correct a deviation in the up-down direction of the spindles between the machining units and moves the spindle device in the front-rear direction using the Z-axis moving mechanism to correct a deviation in the front-rear direction of the spindles between the machining units.

In one or more embodiments of the present invention, when the machine tool includes an automatic tool changer that changes a tool attached to the spindle of each of the machining units, the control device may transmit corrected position data of the spindle to the automatic tool changer.

In one or more embodiments of the present invention, a frame that houses a tool therein in the automatic tool changer includes a horizontal side facing the spindle.

According to one or more embodiments of the present invention, it is possible to correct the spindle spacing by using the X-axis moving mechanism without providing a dedicated device to correct the spindle spacing. Therefore, workpieces can be machined with high accuracy with a simple configuration.

DETAILED DESCRIPTION

Hereinbelow, embodiments of the present invention will be described with reference to the drawings. Identical reference signs designate identical or corresponding parts throughout the drawings. Here, a twin-spindle horizontal machining center provided with two spindles will be described as an example of a machine tool.

(1) Entire Configuration of Horizontal Machining Center

Figure 1:
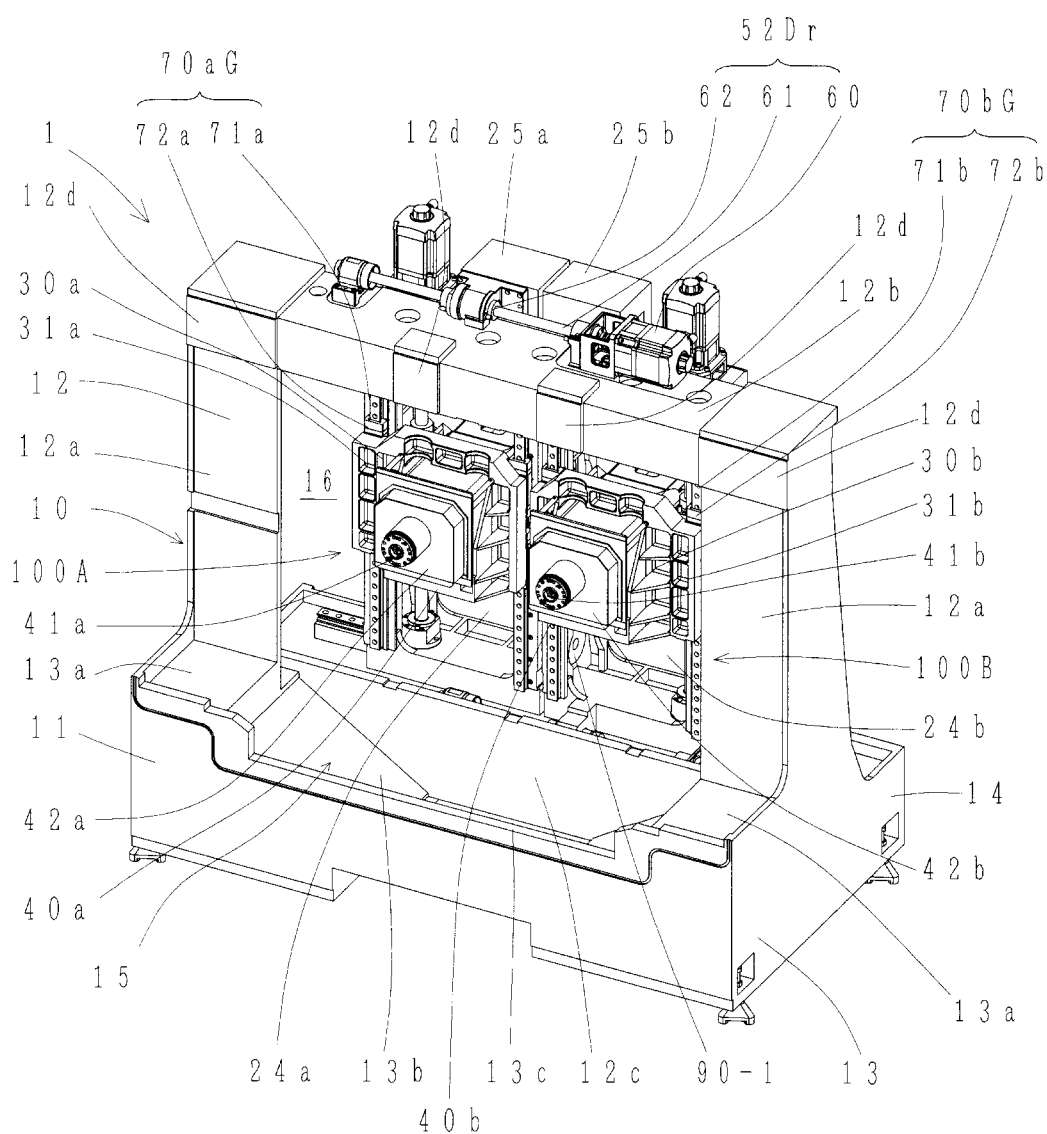
FIG. 1 is a perspective view of a horizontal machining center according to one or more embodiments of the present invention viewed from the front side.
Figure 2:
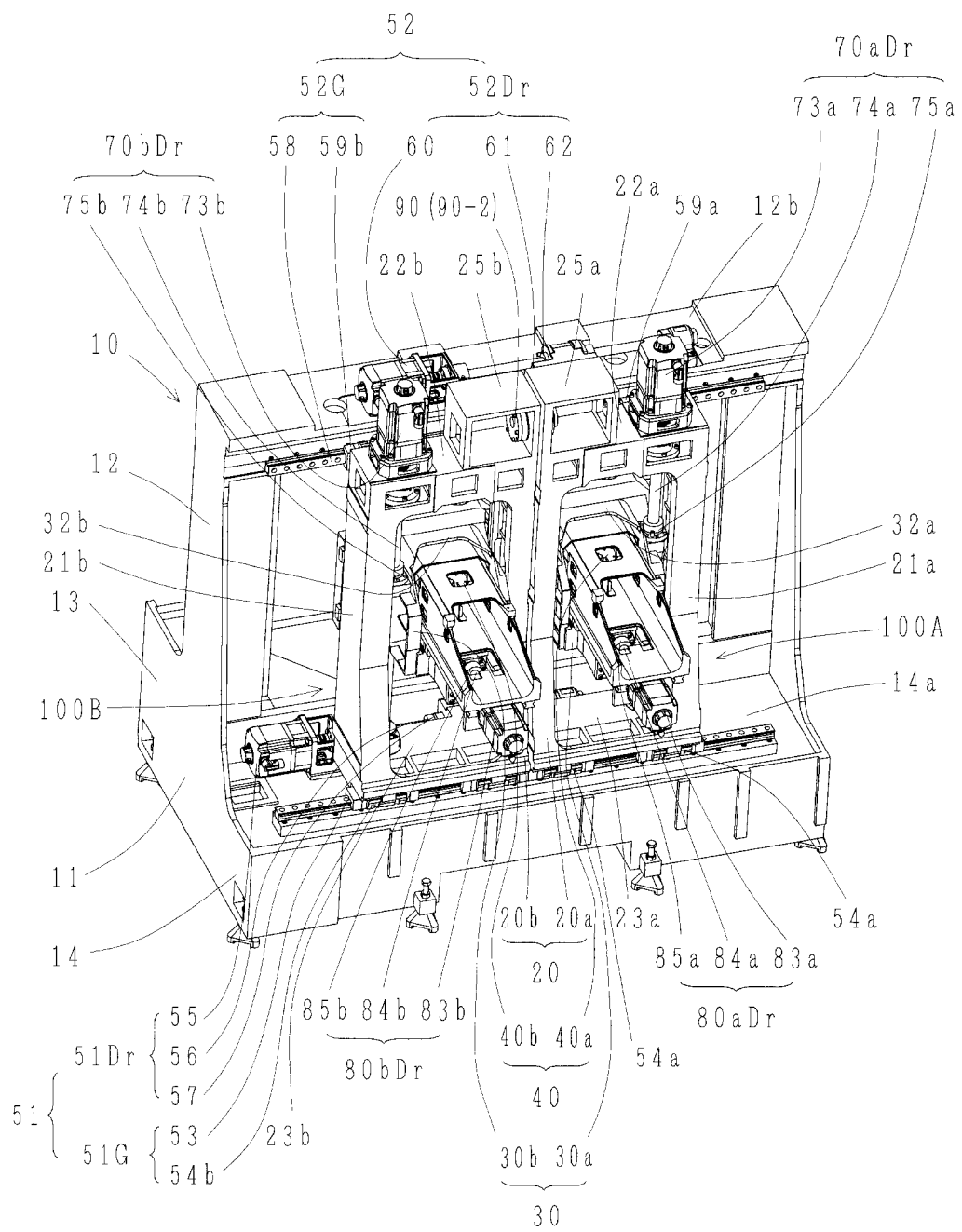
FIG. 2 is a perspective view of the horizontal machining center of FIG. 1 viewed from the rear side.

As illustrated in FIGS. 1 and 2, a horizontal machining center 1 of one or more embodiments of the present invention is provided with a base column 10, a first saddle 20 which is attached to the base column 10 movably in the right-left direction, a second saddle 30 which is attached to the first saddle 20 movably in the up-down direction, and a spindle device 40 which is attached to the second saddle 30 movably in the front-rear direction.

The first saddle 20 includes a main-side first saddle 20a and a sub-side first saddle 20b. The second saddle 30 also includes a main-side second saddle 30a and a sub-side second saddle 30b. The spindle device 40 includes a main-side spindle device 40a and a sub-side spindle device 40b. A spindle 41 provided in the spindle device 40 also includes a main-side spindle 41a and a sub-side spindle 41b.

A main-side machining unit 100A includes the first saddle 20a, the second saddle 30a, and the spindle device 40a. A sub-side machining unit 100B includes the first saddle 20b, the second saddle 30b, and the spindle device 40b. The machining units 100A, 100B are arranged in the right-left direction in such a manner that the spindles 41a, 41b provided in the spindle devices 40a, 40b, respectively, are parallel to each other.

Various tools are detachably attached to the tip of the spindle 41 provided in the spindle device 40. The horizontal machining center 1 moves the spindle device 40 in three-axis directions: the right-left direction (X-axis direction); the up-down direction (Y-axis direction); and the front-rear direction (Z-axis direction) and cuts a workpiece with a tool which rotates integrally with the spindle 41. The two spindles 41a, 41b machine respective workpieces which are the same kind of workpieces and machined in the same method.

(2) Base Column

The base column 10 includes a base part 11 and a portal column part 12 which is disposed on the base part 11. Here, the base part 11 and the column part 12 are integrally formed. The base part 11 is a part that is located at the lowermost part of the horizontal machining center 1 and installed on a floor surface to fix the machine. The base part 11 includes a base front part 13 at the front side of the column part 12 and a base rear part 14 at the rear side of the column part 12 to increase the stability of the machine. Further, the base part 11 and the column part 12 form a single structure as the base column 10 to increase the rigidity.

Figure 3:
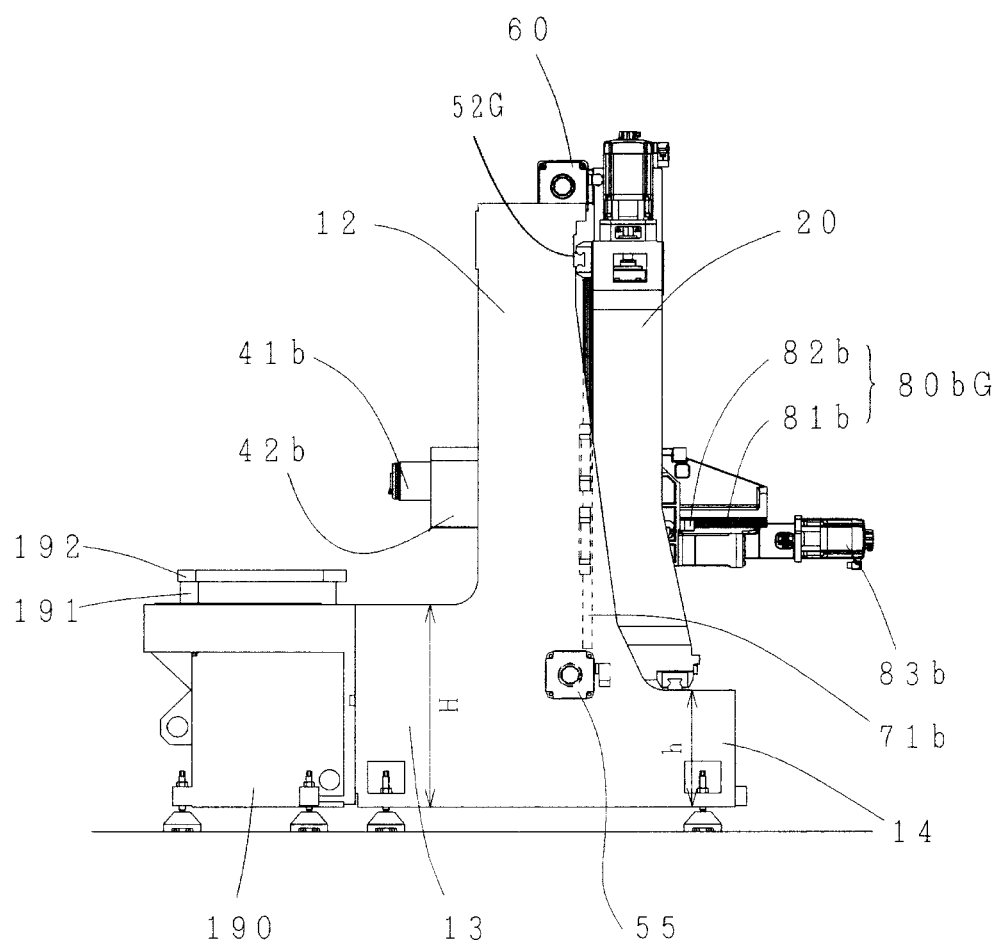
FIG. 3 is a right side view of the horizontal machining center of FIG. 1.

As illustrated in FIG. 3, a thickness h in the up-down direction of the base rear part 14 is smaller than a thickness H in the up-down direction of the base front part 13 (h<H). Specifically, the base front part 13 has the thickness H which is required for maintaining the rigidity of the machine body in cutting workpieces on a work table (not illustrated) placed on a jig base 190 which is connected to the front face of the base front part 13. On the other hand, the base rear part 14 has the thickness h which is smaller than the thickness H of the base front part 13 for lowering the position of the first saddle 20 and other movable parts which are disposed on the upper face of the base rear part 14 to lower the center of gravity of the entire machine.

As illustrated in FIG. 1, the base front part 13 includes horizontal base parts 13a. The respective horizontal base parts 13a are disposed at the right and left sides with a chip discharge part 15 interposed therebetween. This ensures the rigidity of the machine body. Each of the horizontal base parts 13a serves as a stool used by an operator in maintenance and also serves as a space for placing a tool or the like. Further, as illustrated in FIG. 2, the base rear part 14 includes a horizontal base part 14a. As described above, the height of the upper face of the horizontal base part 14a is lower than the height of the upper faces of the horizontal base parts 13a of the base front part 13.

The base front part 13 is provided with the chip discharge part 15. The chip discharge part 15 includes a chute 13b and a through hole 13c. Chips produced during machining of workpieces fall onto the chute 13b, are introduced into the through hole 13c, and are discharged to a chip conveyor (not illustrated) which is installed under the base column 10 from the through hole 13c. This minimizes accumulation of chips on the base part 11 and prevents a reduction in the machining accuracy caused by thermal expansion of the machine.

The column part 12 includes a pair of pillar members 12a, 12a which stands on the base part 11 and an upper beam member 12b which couples the upper ends of the pillar members 12a, 12a. The pillar members 12a, 12a are arranged at a predetermined spacing in the right-left direction. The predetermined spacing between the pillar members 12a, 12a is sufficient so that the two first saddles 20a, 20b which are guided in the right-left direction can move in the right-left direction within a range required for machining. A wall part 12c guides chips falling onto the chip discharge part 15 to the through hole 13c to prevent the chips from accumulating on the machine body and also functions as a lower beam member which couples the lower ends of the pillar members 12a, 12a. The pair of pillar members 12a, 12a, the upper beam member 12b, and the wall part 12c form a square window 16 which is open in the front-rear direction.

As illustrated in FIG. 2, an X-axis guide rail 58 of an X-axis guide mechanism 52G (described below) is fixed to the rear face of the upper beam member 12b. Further, as illustrated in FIG. 1, two pairs of reference planes 12d to which automatic tool changers 200, 300 (refer to FIGS. 5 and 6, described below) are attached are disposed on the front face of the upper beam member 12b and the upper front faces of the pillar members 12a, 12a. Although the plurality of reference planes 12d are provided in one or more embodiments, a single reference plane elongated in the horizontal direction may be disposed on the front face or the upper face of the upper beam member 12b.

Note that the present invention is not limited to the above embodiments, and the base column 10 may include, for example, a base part 11 and a column part 12 which are separate bodies. Further, the upper beam member 12b of the column part 12 may be formed as a separate body from the pillar members 12a and may be coupled to the pillar members 12a using a fixing member.

(3) First Saddle

As illustrated in FIG. 2, the first saddles 20 (the main-side first saddle 20a and the sub-side first saddle 20b) are disposed at the rear side of the column part 12 and each saddle is made of a frame-like member which is movable in the right-left direction. Specifically, the main-side first saddle 20a includes a pair of right and left pillar members 21a, 21a, an upper beam member 22a which couples the upper parts of the pillar members 21a, 21a, and a lower beam member 23a which couples the lower parts of the pillar members 21a, 21a. These members 21a to 23a form a vertically-elongated window 24a (refer to FIG. 1) which is located on the center of the first saddle 20a and is open in the front-rear direction. The sub-side first saddle 20b is also configured similarly to the main-side first saddle 20a, and includes pillar members 21b, an upper beam member 22b, a lower beam member 23b, and a square window 24b.

The square window 16 (described above) of the column part 12 will be described in more detail with the relationship with the first saddles 20. The square window 16 has a vertical length equal to or longer than the vertical length of each of the vertically-elongated windows 24 (24a, 24b) of the first saddles 20 (20a, 20b). Although not illustrated in the drawings, the square window 16 overlaps the vertically-elongated windows 24 in the vertical direction. Further, a horizontal width of the square window 16 is wider than a width obtained by adding the horizontal widths of the two first saddles 20. The upper part of each of the first saddles 20 is supported on the rear face of the upper beam member 12b of the column part 12 through the X-axis guide mechanism 52G (described below). The lower part of each of the first saddles 20 is supported on the horizontal base part 14a of the base rear part 14 through an X-axis guide mechanism 51G. Thus, the column part 12 (first column) and each of the first saddles 20 (second column) both having a portal shape form a double-column structure. Therefore, even though the column part 12 has a wide portal shape, the machine can obtain high rigidity and stability.

Further, arranging movable parts such as the first saddles 20 and the second saddles 30 (described below) at the rear side of the column part 12 shortens the depth in the front-rear direction of the machine. Thus, a maintenance operation with respect to each of moving mechanisms 50, 70, 80 (described below) can be easily performed from the rear side of the machine.

(4) Clamping Devices for First Saddles

Next, clamping devices 90 which couple the main-side first saddle 20a and the sub-side first saddle 20b will be described.

Figure 4:
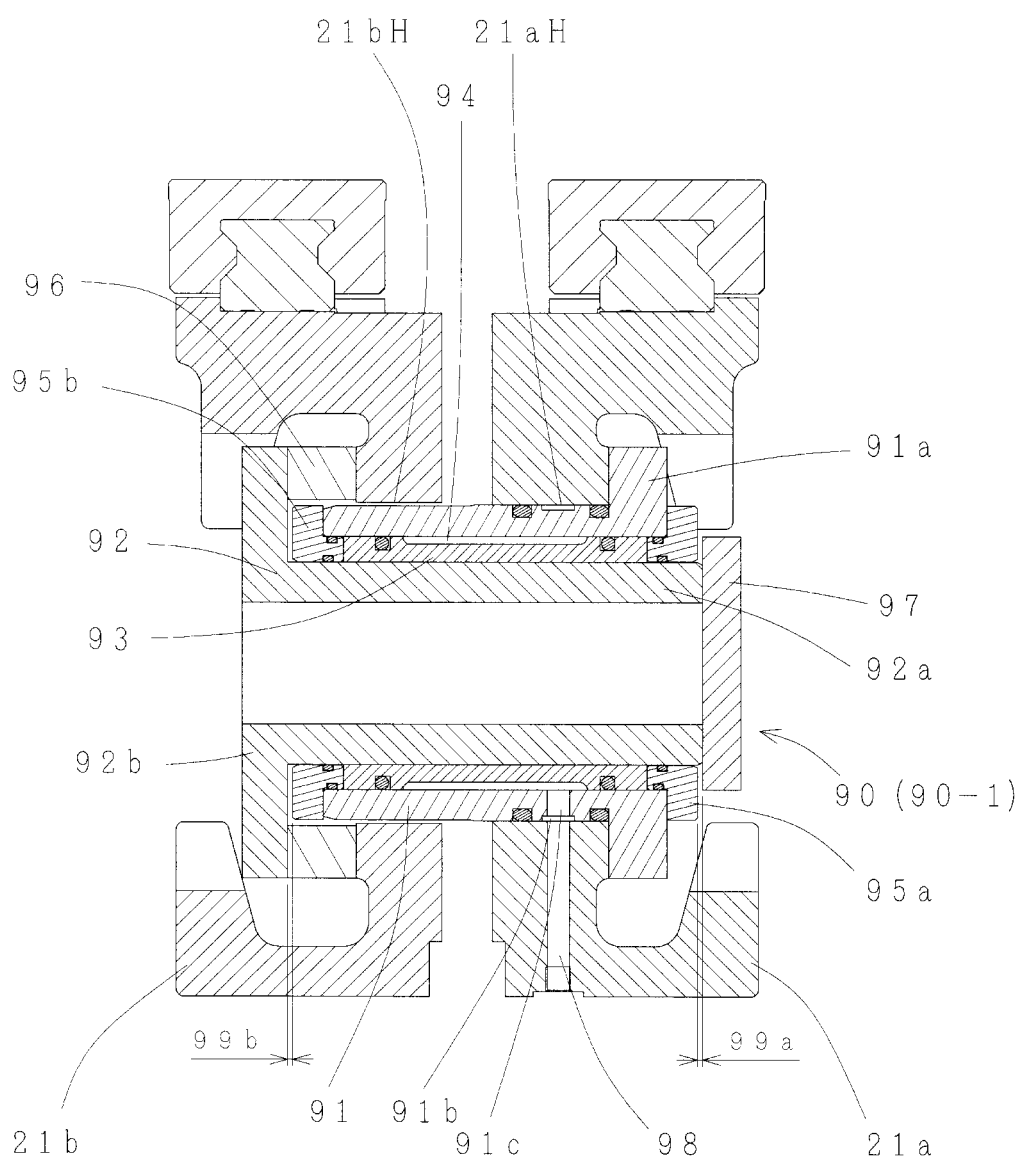
FIG. 4 is a sectional view of a clamping device which couples first saddles of the horizontal machining center of FIG. 1.

As illustrated in FIGS. 1 and 2, the clamping devices 90 (90-1, 90-2) are disposed at two positions of the first saddles 20: the upper parts of the upper beam members 22; and the lower parts of the pillar members 21, and couple the two main-side and sub-side first saddles 20a, 20b. FIG. 4 is a sectional view of the clamping device 90-1 which is disposed at the lower parts of the pillar members 21.

As illustrated in FIG. 4, holes 21aH, 21bH are formed on lower side walls of the adjacent pillar members 21a, 21b of the first saddles 20a, 20b, respectively. The clamping device 90-1 having a cylindrical shape penetrates these holes in the horizontal direction. The clamping device 90-1 includes a housing 91, a shaft 92, and a clamping sleeve 93. The housing 91 includes a flange part 91a, and is inserted from the main-side hole 21 aH to the sub-side hole 21bH. The clamping sleeve 93 is fitted and inserted into the housing 91 so that an annular space 94 is formed along the inner wall of the housing 91. Ring members 95 (95a, 95b) are provided for preventing the clamping sleeve 93 from moving in the right-left direction in FIG. 4 inside the housing 91. The respective ring members 95 are fixed to the right and left sides of the housing 91 with screws to constitute a part of the housing 91. The housing 91 is fixed to the inner wall of the main-side pillar member 21a with screws at the flange part 91a.

The hollow shaft 92 includes a cylindrical part 92a and a flange part 92b, and the cylindrical part 92a is fitted and inserted into the clamping sleeve 93 from the sub-side hole 21 bH. The length in the horizontal direction of the cylindrical part 92a is slightly longer than the length in the horizontal direction of the housing 91. The flange part 92b is fixed to the inner wall of the sub-side pillar member 21b with screws through a spacer 96. A plate 97 which is larger than the outer diameter of the cylindrical part 92a and smaller than the outer diameter of the ring member 95a is fixed to the end of the cylindrical part 92a with screws so as to prevent the shaft 92 from coming off in the left direction. The plate 97 constitutes a part of the shaft 92.

The main-side pillar member 21a is provided with a hydraulic channel 98. When pressure is applied to hydraulic oil filled inside the annular space 94 from the hydraulic channel 98 through an annular groove 91b formed on the side face of the housing 91 and an oil hole 91c formed on the housing 91, the clamping sleeve 93 presses the cylindrical part 92a to clamp the shaft 92.

FIG. 4 illustrates a state in which the shaft 92 is clamped with a clearance 99a which is formed between the ring member 95a and the plate 97 substantially equal to a clearance 99b which is formed between the ring member 95b and the flange part 92b. When the pressure to the hydraulic oil inside the annular space 94 is reduced, a pressing force of the clamping sleeve 93 pressing the cylindrical part 92a is weakened, thus the shaft 92 becomes an unclamped state in which the clamping is released. In the unclamped state, the shaft 92 is movable in the right-left direction inside the housing 91 within the range of the clearances 99a, 99b.

The clamping device 90-1 which is disposed on the lower parts of the pillar members 21 has been described above. The clamping device 90-2 inside box-like frame members 25a, 25b which are disposed adjacent to each other on the upper parts of the upper beam members 22a, 22b illustrated in FIG. 2 also has a structure similar to the structure of the clamping device 90-1 described above.

Note that the state in which the main-side first saddle 20a and the sub-side first saddle 20b are coupled indicates a state in which the respective shafts 92 of the two upper and lower clamping devices 90-1, 90-2 are both clamped. In this state, the main-side machining unit 100A and the sub-side machining unit 100B are integrally guided in the right-left direction. Further, when the respective shafts 92 of the two clamping devices 90-1, 90-2 are simultaneously unclamped, the coupling between the machining units 100A, 100B is released.

(5) X-Axis Moving Mechanism

The X-axis moving mechanisms 51, 52 are mechanisms for moving the first saddles 20 in the right-left direction. In one or more embodiments of the present invention, the main-side X-axis moving mechanism 52 is disposed on the upper side, and the sub-side X-axis moving mechanism 51 is disposed on the lower side. These X-axis moving mechanisms 51, 52 are known mechanisms, and are provided with an X-axis guide mechanisms 51G, 52G and X-axis feed mechanisms 51Dr, 52Dr, respectively.

The X-axis guide mechanism 51G provided in the X-axis moving mechanism 51 includes an X-axis guide rail 53 which is disposed on the horizontal base part 14a of the base rear part 14 and extends in the right-left direction, a pair of X-axis sliders 54a which is attached to the lower face of the lower beam member 23a of the main-side first saddle 20a, and a pair of X-axis sliders 54b which is attached to the lower face of the lower beam member 23b of the sub-side first saddle 20b. The X-axis feed mechanism 51Dr is provided with an X-axis drive motor 55 which is installed on the horizontal base part 14a of the base rear part 14, an X-axis ball screw 56 which is coupled to the X-axis drive motor 55, and a nut 57 which is screwed with the X-axis ball screw 56. The nut 57 is fixed to the front face of the lower beam member 23b of the sub-side first saddle 20b, and the X-axis ball screw 56 is rotated by the X-axis drive motor 55.

The X-axis guide mechanism 52G provided in the X-axis moving mechanism 52 includes the X-axis guide rail 58 which is disposed on the rear face of the upper beam member 12b of the column part 12 and extends in the right-left direction, a pair of X-axis sliders 59a which is attached to the front face of the upper beam member 22a of the main-side first saddle 20a, and a pair of X-axis sliders 59b which is attached to the front face of the upper beam member 22b of the sub-side first saddle 20b. The X-axis feed mechanism 52Dr is provided with an X-axis drive motor 60 which is installed on the upper face of the upper beam member 12b of the column part 12, an X-axis ball screw 61 which is coupled to the X-axis drive motor 60, and a nut 62 which is screwed with the X-axis ball screw 61. The nut 62 is fixed to the front face of the box-like frame member 25a of the main-side first saddle 20a, and the X-axis ball screw 61 is rotated by the X-axis drive motor 60.

The X-axis moving mechanism 51 moves the sub-side first saddle 20b in the right-left direction, and the X-axis moving mechanism 52 moves the main-side first saddle 20a in the right-left direction. That is, the machining units 100A, 100B are provided with the X-axis moving mechanisms 52, 51, respectively, each of which is independent.

In machining workpieces, the two main-side and sub-side first saddles 20a, 20b are coupled by the clamping devices 90 described above and guided as an integrated structure in the right-left direction. The first saddles 20 which are coupled and integrated by the clamping devices 90 have high rigidity. Further, the X-axis drive motor 55 of the X-axis moving mechanism 51 and the X-axis drive motor 60 of the X-axis moving mechanism 52 are synchronously rotated. Accordingly, the integrated structure of the first saddles 20 can be moved in a strong and stable state in the right-left direction along the X-axis guide rails 53, 58 by the two driving sources.

In one or more embodiments of the present invention, as illustrated in FIG. 2, the X-axis drive motors 55, 60 of the X-axis moving mechanisms 51, 52 are installed at the same side (sub-side). Thus, the ball screws 56, 61 rotate in the same direction. The X-axis feed mechanisms 51Dr, 52Dr are arranged on substantially the same vertical line. This arrangement is extremely well-balanced and gives a stability to the machine when the spindle devices 40 are guided in the up-down direction (Y-axis direction) and the front-rear direction (Z-axis direction).

(5) Second Saddle

The second saddle 30 is supported movably in the up-down direction by the first saddle 20. Specifically, the main-side second saddle 30a is supported movably in the up-down direction by the main-side first saddle 20a, and the sub-side second saddle 30b is supported movably in the up-down direction by the sub-side first saddle 20b. The main-side second saddle 30a includes a tubular member which holds the spindle device 40a. The main-side second saddle 30a is provided with a flange part 31a which is provided with Y-axis sliders 72a (described below) on the back face thereof and a holding part 32a which houses a Z-axis moving mechanism 80a (described below) and the spindle device 40a therein. The second saddle 30a is supported by the first saddle 20a through a Y-axis guide mechanism 70aG which is disposed between the flange part 31a and the pair of right and left pillar members 21a of the first saddle 20a, and moves in the up-down direction inside the vertically-elongated window 24a of the first saddle 20a. The sub-side second saddle 30b also has a structure similar to the structure of the main-side second saddle 30a described above.

(7) Y-Axis Moving Mechanism

A Y-axis moving mechanism 70 is a mechanism for moving the second saddle 30 in the up-down direction and provided with a Y-axis guide mechanism 70G and a Y-axis feed mechanism 70Dr. Specifically, a main-side Y-axis moving mechanism 70a is provided with the Y-axis guide mechanism 70aG and a Y-axis feed mechanism 70aDr, and moves the main-side second saddle 30a in the up-down direction. A sub-side Y-axis moving mechanism 70b is provided with a Y-axis guide mechanism 70bG and a Y-axis feed mechanism 70bDr, and moves the sub-side second saddle 30b in the up-down direction.

The main-side Y-axis guide mechanism 70aG includes a pair of Y-axis guide rails 71a and four Y-axis sliders 72a. The Y-axis guide rails 71a are disposed on the front faces of the pair of right and left pillar members 21a of the main-side first saddle 20a and extend in the up-down direction. Two of the Y-axis sliders 72a are disposed on the right rear face of the flange part 31a of the main-side second saddle 30a and fitted with one of the Y-axis guide rails 71a, and the other two of the Y-axis sliders 72a are disposed on the left rear face of the flange part 31a and fitted with the other Y-axis guide rail 71a. The main-side Y-axis feed mechanism 70aDr is provided with a Y-axis drive motor 73a which is attached to the upper face of the upper beam member 22a of the main-side first saddle 20a, a Y-axis ball screw 74a which is coupled to the Y-axis drive motor 73a, and a nut 75a which is screwed with the Y-axis ball screw 74a. The nut 75a is fixed to a holding part 32a of the main-side second saddle 30a. The sub-side Y-axis moving mechanism 70b also has a configuration similar to the configuration of the main-side Y-axis moving mechanism 70a.

The Y-axis drive motor 73a provided in the main-side Y-axis feed mechanism 70aDr and the Y-axis drive motor 73b provided in the sub-side Y-axis feed mechanism 70bDr may be synchronously rotated or may also be nonsynchronously rotated. The Y-axis ball screws 74a, 74b are rotated by rotating the two Y-axis drive motors 73a, 73b, and the second saddles 30a, 30b move in the up-down direction along the Y-axis guide rails 71a, 71b, respectively. The Y-axis moving mechanism 70 is a known mechanism.

As illustrated in FIG. 3 (only the Y-axis guide rail 71b is illustrated in FIG. 3), the Y-axis guide rails 71a, 71b of the Y-axis guide mechanisms 70G are vertically disposed between the upper part of the first saddle 20 and the upper part of the column part 12 when viewed from the side face. That is, the X-axis guide mechanism 52G and the Y-axis guide mechanisms 70G are located on substantially the same plane (XY plane).

(8) Spindle Device

The spindle device 40 is supported by the second saddle 30, and provided with the spindle 41 and a spindle housing 42. Specifically, the main-side spindle device 40a is supported by the main-side second saddle 30a, and provided with the spindle 41a and a spindle housing 42a. The sub-side spindle device 40b is supported by the sub-side second saddle 30b, and provided with the spindle 41b and a spindle housing 42b.

The spindle 41a of the main-side spindle device 40a is held rotatably around the Z axis inside the spindle housing 42a. The spindle 41a is coupled to a rotation shaft of a spindle drive motor (not illustrated) which is installed in the spindle housing 42a. Various tools (not illustrated) are detachably attached to the front end of the spindle 41a. A Z-axis guide rail (not illustrated) of a main-side Z-axis guide mechanism (not illustrated, described below) is attached to the lower face of the spindle housing 42a in the front-rear direction. The spindle device 40a is held movably in the front-rear direction through the Z-axis guide mechanism inside the flange part 31a and the holding part 32a of the main-side second saddle 30a. Accordingly, the spindle device 40a is movable in the up-down direction and the front-rear direction inside the vertically-elongated window 24a of the first saddle 20a and movable in the right-left direction, the up-down direction, and the front-rear direction inside the square window 16 of the column part 12. Note that the vertical length of the square window 16 is longer than a stroke in the up-down direction of the spindle 41a. The sub-side spindle device 40b also has a configuration similar to the configuration of the main-side spindle device 40a described above.

(9) Z-Axis Moving Mechanism

The Z-axis moving mechanism 80 is a mechanism for moving the spindle device 40 in the front-rear direction and provided with a Z-axis guide mechanism 80G and a Z-axis feed mechanism 80Dr which are known mechanisms. Specifically, a main-side Z-axis moving mechanism 80a is provided with a Z-axis guide mechanism (not illustrated) and a Z-axis feed mechanism 80aDr, and a sub-side Z-axis moving mechanism 80b is provided with a Z-axis guide mechanism 80bG and a Z-axis feed mechanism 80bDr. Hereinbelow, the sub-side Z-axis moving mechanism 80b will be described.

As illustrated in FIG. 3, the Z-axis guide mechanism 80bG of the sub-side Z-axis moving mechanism 80b includes a Z-axis guide rail 81b and a plurality of Z-axis sliders 82b. The Z-axis guide rail 81b is attached to the lower face of the spindle housing 42b and extends in the front-rear direction. The Z-axis sliders 82b are fixed to the right and left sides of the holding part 32b of the second saddle 30b and fitted with each Z-axis guide rail 81b. The sub-side Z-axis feed mechanism 80bDr includes a Z-axis drive motor 83b which projects to the rear side of the holding part 32b of the second saddle 30b, a Z-axis ball screw 84b which is coupled to the Z-axis drive motor 83b, and a nut 85b which is screwed with the Z-axis ball screw 84b. The nut 85b is fixed to the spindle housing 42b. The spindle device 40b moves in the front-rear direction along the Z-axis guide rail 81b by rotating the Z-axis ball screw 84b by the Z-axis drive motor 83b. The main-side Z-axis moving mechanism 80a also has a configuration similar to the configuration of the sub-side Z-axis moving mechanism 80b described above.

Note that the number and location of installed Z-axis sliders 82b of the sub-side second saddle 30b can be selected in any manner according to the number and location of installed Z-axis guide rails 81b. The same applies to the main-side Z-axis moving mechanism 80a.

(10) Jig Base

FIG. 3 illustrates a state in which the jig base 190 is arranged on the front side of the horizontal machining center 1. The jig base 190 is a structure that is attached to the front face of the base front part 13 of the base column 10 and fixed to the floor surface. The width in the right-left direction and the height in the up-down direction of the jig base 190 are equal to the width in the right-left direction and the height in the up-down direction of the base front part 13. For example, an A-axis table (not illustrated) is placed on the jig base 190.

The jig base 190 is provided with a chip discharge part (not illustrated) which is similar to the chip discharge part 15 provided in the base front part 13. The chip discharge part includes a chute (not illustrated) and a through hole (not illustrated). Chips produced during machining of workpieces fall onto the chute, are introduced into the through hole, and are discharged to a chip conveyor (not illustrated) which is installed under the jig base 190 from the through hole. This minimizes accumulation of chips on the jig base 190 and prevents a reduction in the machining accuracy caused by thermal expansion of the jig base 190.

Further, similarly to the horizontal base parts 13*a* of the base front part 13, the jig base 190 is provided with horizontal base parts 191 at both the right and left sides with the chip discharge part interposed therebetween. Placement bases 192 are disposed on the upper face of the respective horizontal base parts 191, and a drive part and a support part (not illustrated) of the A-axis table are placed on each of the placement bases 192.

Note that although, in one or more embodiments of the present invention, the jig base 190 on which the A-axis table is placed has been described as an example, a B-axis table may be placed on the jig base 190. Further, a jig base having a jig changer specification or a jig base having a pallet changer specification may be provided. Moreover, the chip discharge part may be omitted, and chips may be discharged to the chip discharge part 15 of the base front part 13.

Although not illustrated, jigs respectively corresponding to the main side and the sub side are disposed on the table, and reference holes for position measurement are formed on the respective jigs at positions corresponding to the main-side spindle 41*a* and the sub-side spindle 41*b*. The reference holes are required for correcting the spacing between the spindles 41*a*, 41*b*. The correction of the spindle spacing will be described in detail below.

(11) Automatic Tool Changer

Figure 5:
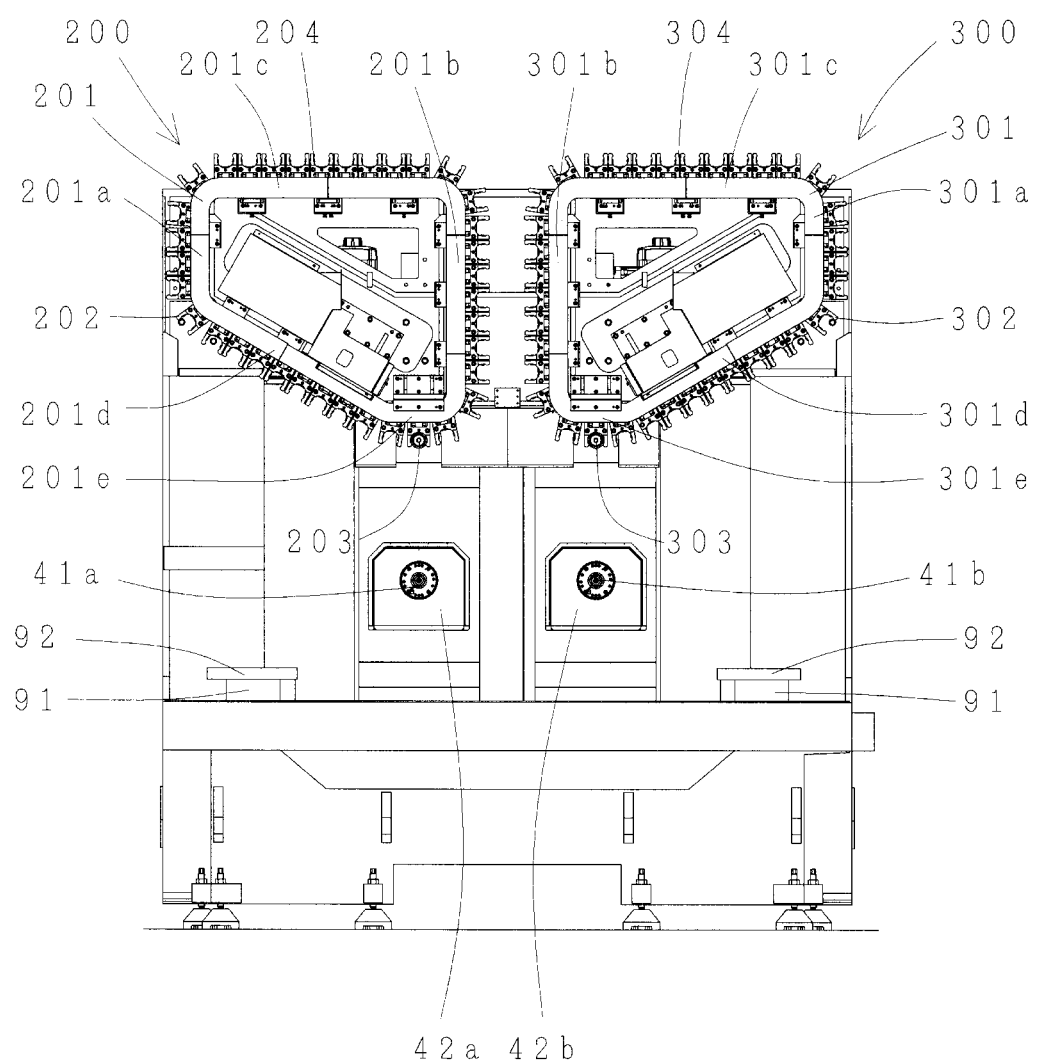
FIG. 5 is a front view illustrating a state in which automatic tool changers are attached to the horizontal machining center of FIG. 1.
Figure 6:
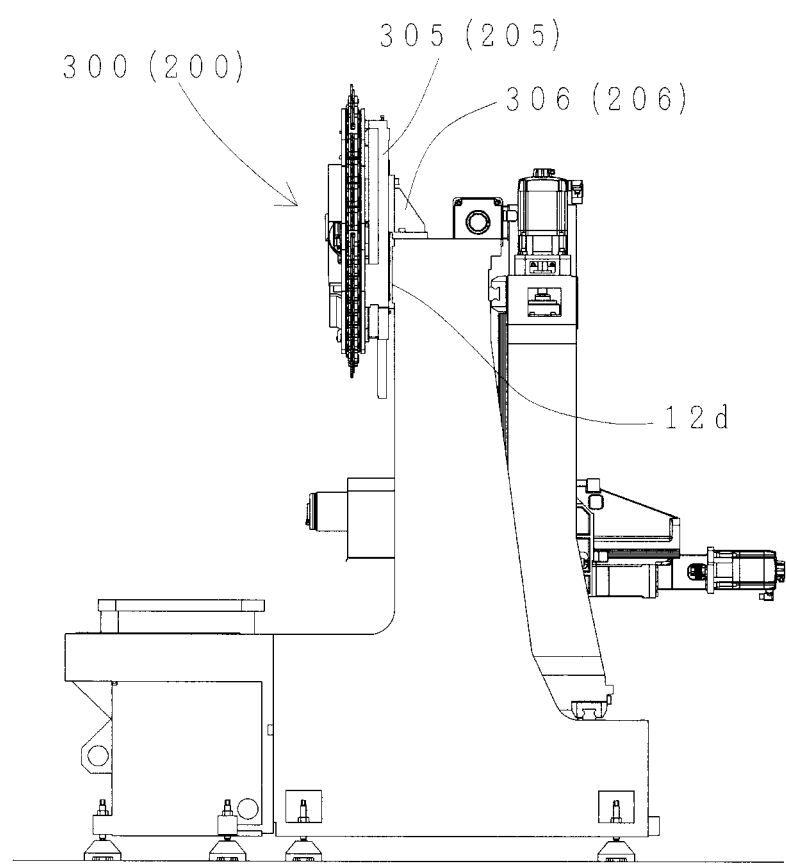
FIG. 6 is a right side view of the horizontal machining center of FIG. 7 according to one or more embodiments.

FIG. 5 illustrates a state in which the automatic tool changers (hereinbelow, referred to as "ATC units") 200, 300 are attached to the reference planes 12*d* (refer to FIG. 1) which are disposed on the front face of the upper beam member 12*b* of the column part 12.

The main-side ATC unit 200 is provided with a large number of tool holding members 202 around a circumferential edge of a frame 201 having a generally trapezoidal shape. These tool holding members 202 include a coupling part for coupling the tool holding members to each other through a link mechanism (not illustrated) such as a chain, a cam follower part (not illustrated) which constitutes a part of a cam mechanism for moving the coupled tool holding members along the circumferential edge of the frame 201, and claw parts 204 which grasp a tool 203. A motor (not illustrated) positions the tool holding member 202 grasping the tool 203 that should be grasped by the main-side spindle 41*a* at a tool change position (described below).

In one or more embodiments of the present invention, a so-called direct change system is employed as an automatic tool change system. The direct change system directly transfers the tools 203, 303 between the ATC units 200, 300 and the spindles 41*a*, 41*b*.

Next, the main-side frame 201 will be described in detail. As illustrated in FIG. 5, the frame 201 has a generally trapezoidal shape and includes five sides 201*a* to 201*e*. The two parallel sides 201*a*, 201*b* are vertically arranged in front view. In these two sides, the short side 201*a* is located at the outer side of the machine, and the long side 201*b* is located at the inner side of the machine. The horizontal side 201*c* is perpendicular to the above two sides, and the inclined side 201*d* is inclined so as to come close to the spindle 41*a* from the outer side toward the inner side of the machine. The horizontal side 201*e* is located above the spindle housing 42*a* and has a length substantially equal to the width in the right-left direction of the spindle housing 42*a*.

The horizontal side 201*e* faces the spindle 41*a*. The tool 203 which is grasped by the tool holding member 202 positioned at substantially the center of the horizontal side 201*e* is held by the spindle 41*a*. Note that the tool holding member 202 has a known structure and includes the claw part 204 which includes two claws for grasping the tool 203. The claw part 204 becomes a vertically downward attitude at the horizontal side 201*e* of the frame 201 and grasps the tool 203.

The frame 201 is held by a holding member 205 (see FIG. 6) and a bracket 206 (see FIG. 6) at the back side. Thus, the ATC unit 200 is fixed not only to the reference planes 12*d* of the column part 12, but also to the upper face of the upper beam member 12*b*, and stably attached to the base column 10.

The sub-side ATC unit 300 includes a frame 301 which is bilaterally symmetric with the main-side frame 201 and has a configuration similar to the configuration of the main-side ATC unit 200.

In one or more embodiments of the present invention, the reference planes 12*d* are disposed on the upper front face of the column part 12. Thus, it is only required that the ATC units 200, 300 previously assembled are attached to the reference planes 12*d*. Further, the frames 201, 301 include the inclined sides 201*d*, 301*d* which are inclined so as to come close to the spindles 41*a*, 41*b* from the outer side toward the inner side of the machine. Thus, there is no obstacle to the front faces of the pillar members 12*a* of the column part 12. Thus, for example, a delivering device which delivers a tool whose cutter is broken can be disposed on the front faces of the pillar members 12*a*, which enables a space to be effectively utilized.

(12) Correction of Spindle Spacing

As described at the beginning, in a machine tool provided with a plurality of spindles, a displacement occurs in the spindle spacing due to a temperature change and heat generated during machining of workpieces, which reduces the machining accuracy. Thus, correction of the spindle spacing is required. Hereinbelow, the correction will be described in detail.

Figure 7:
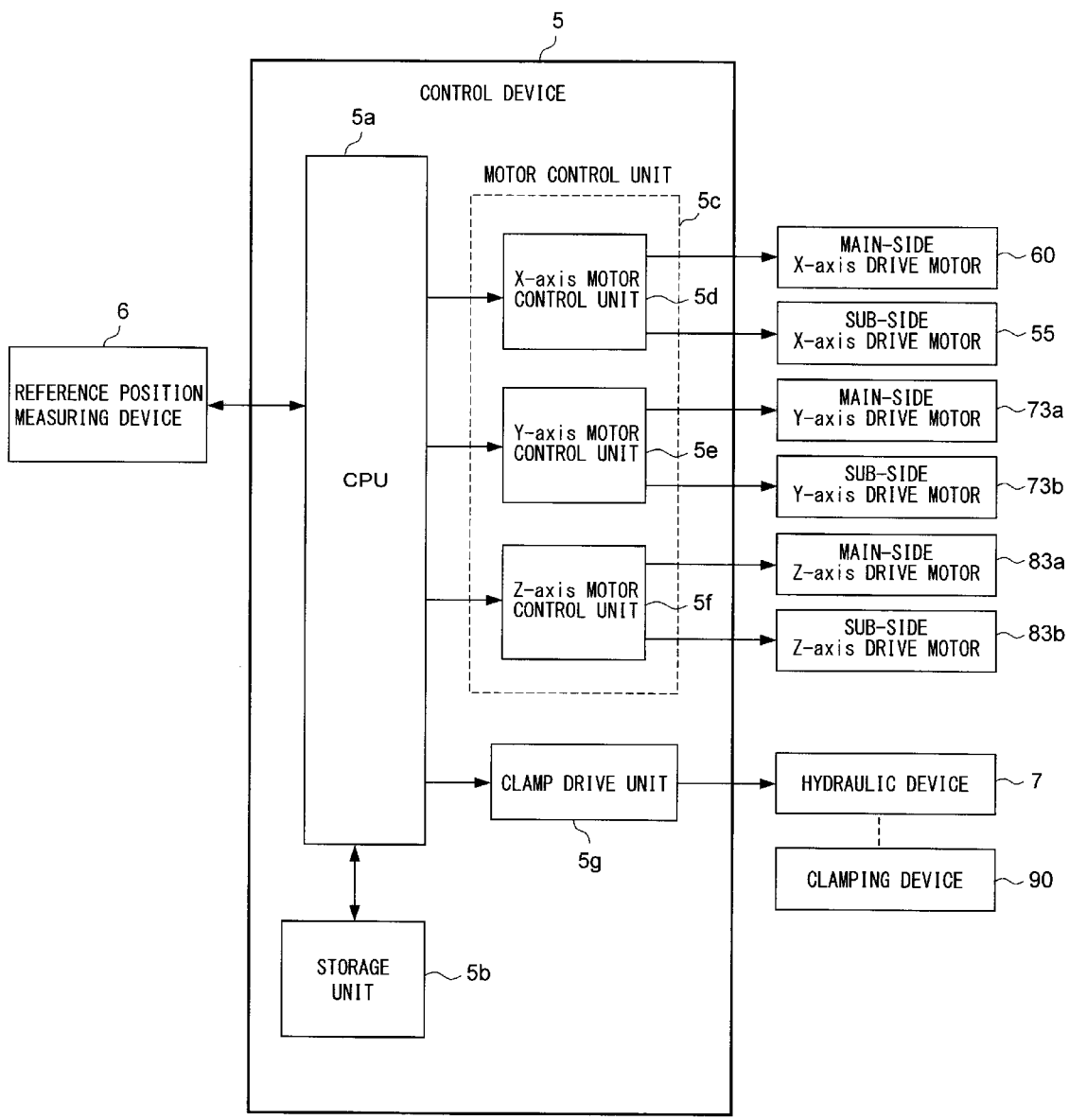
FIG. 7 is a block diagram illustrating a configuration for correcting a spindle spacing according to one or more embodiments.

FIG. 7 illustrates a configuration for performing the correction of the spindle spacing. A control device 5 is provided with a CPU 5*a*, a storage unit 5*b*, a motor control unit 5*c*, and a clamp drive unit 5*g*. The control device 5 also includes blocks that perform various processes in addition to these blocks. However, only the blocks relating to the correction are illustrated.

The CPU 5*a* includes a microprocessor and controls the entire operation of the machine tool (horizontal machining center 1). The operation includes a normal operation for machining workpieces and also includes an operation for correcting the spindle spacing. The storage unit 5b, the motor control unit 5c, the clamp drive unit 5g, and a reference position measuring device 6 are connected to the CPU 5a, and transmission and reception of signals and data are performed between the CPU 5a and these parts. The storage unit 5b includes a program memory which stores a program required for control performed by the CPU 5a and a data memory which stores data required for the control (not illustrated). The motor control unit 5c includes an X-axis motor control unit 5d, a Y-axis motor control unit 5e, and a Z-axis motor control unit 5f.

The X-axis motor control unit 5d controls the X-axis drive motor 60 provided in the main-side X-axis feed mechanism 52Dr and the X-axis drive motor 55 provided in the sub-side X-axis feed mechanism 51Dr. The Y-axis motor control unit 5e controls the Y-axis drive motor 73a provided in the main-side Y-axis feed mechanism 70aDr and the Y-axis drive motor 73b provided in the sub-side Y-axis feed mechanism 70bDr. The Z-axis motor control unit 5f controls the Z-axis drive motor 83a provided in the main-side Z-axis feed mechanism 80aDr and the Z-axis drive motor 83b provided in the sub-side Z-axis feed mechanism 80bDr. The clamp drive unit 5g includes a drive circuit which drives a hydraulic device 7 which applies pressure to hydraulic oil inside the annular space 94 (FIG. 4) of the clamping device 90.

Figure 9:
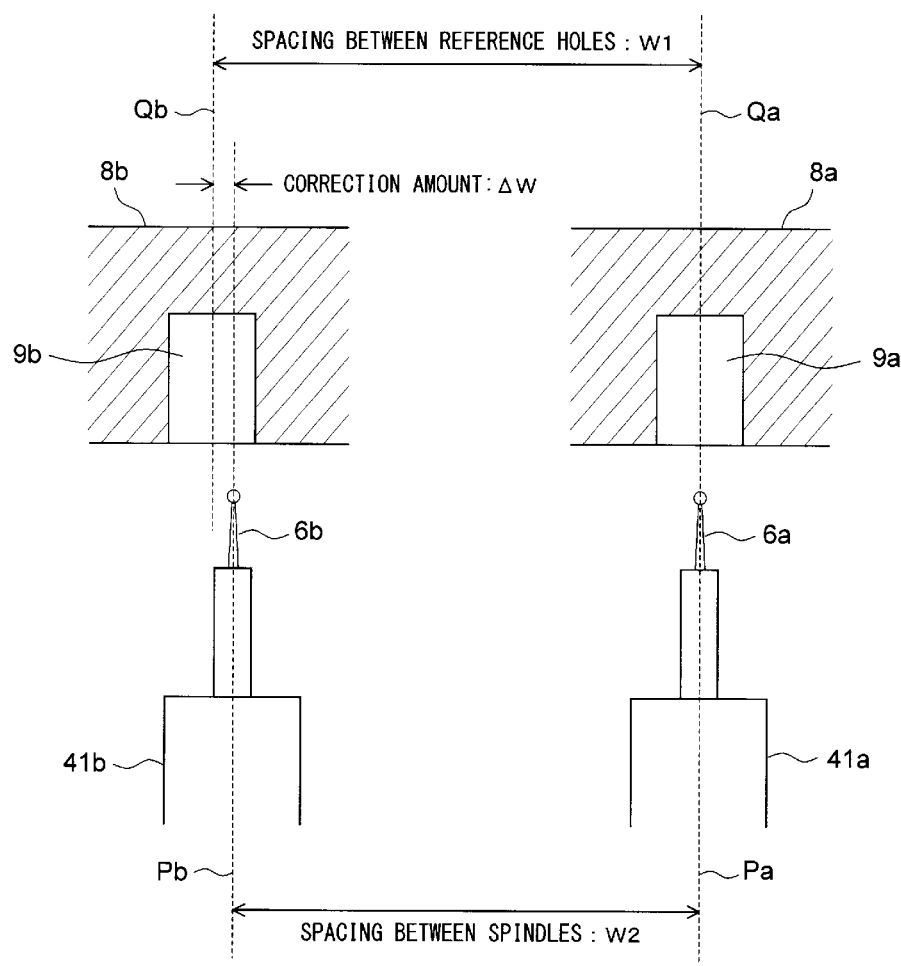
FIG. 9 is a schematic view illustrating the principle of spindle spacing correction according to one or more embodiments.

As illustrated in FIG. 9 (described below), the reference position measuring device 6 is provided with touch probes 6a, 6b which are attached to tips of the main-side spindle 41a and the sub-side spindle 41b, respectively. The touch probes 6a, 6b detect the positions of reference holes 9a, 9b which are formed on jigs 8a, 8b, and the CPU 5a corrects the spacing between the spindles 41a, 41b on the basis of a result of the detection.

Figure 8:
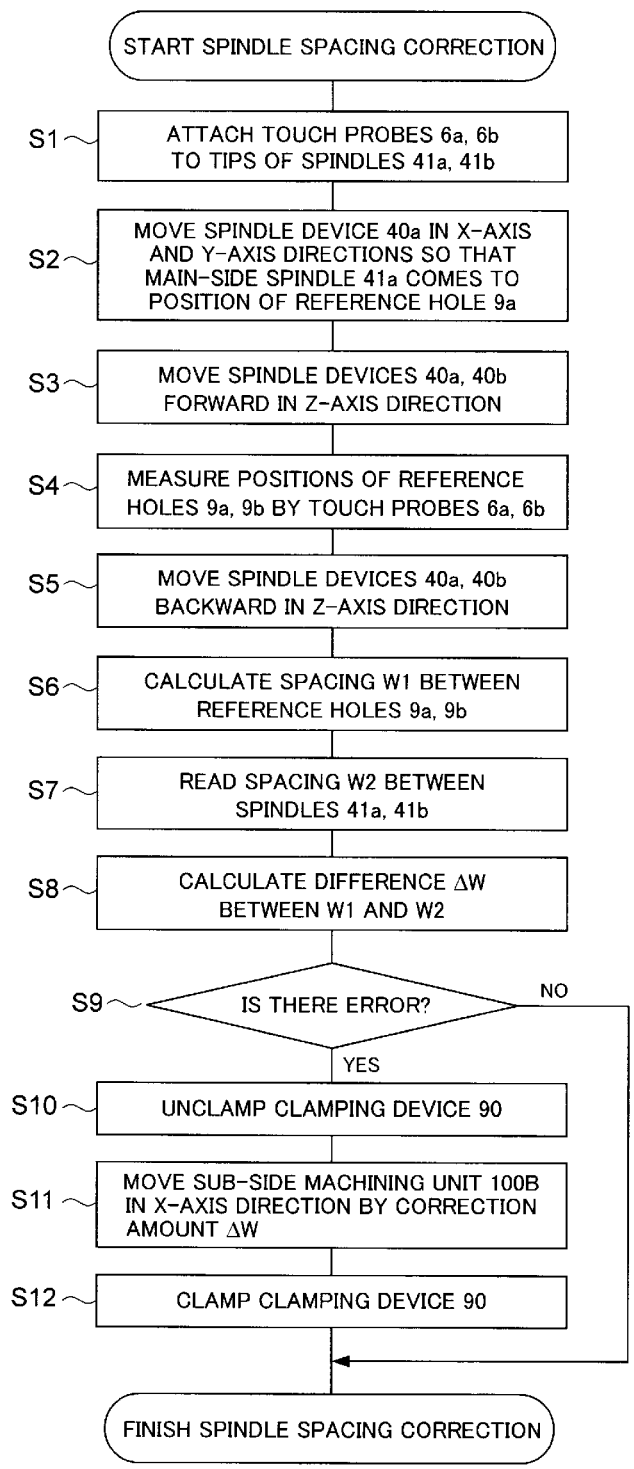
FIG. 8 is a flowchart illustrating an operation of a control device of FIG. 7.

FIG. 8 is a flowchart illustrating a procedure of the spindle spacing correction. The procedure is executed by the CPU 5a in accordance with a spindle spacing correction program stored in the storage unit 5b. Hereinbelow, the spindle spacing correction procedure will be described in detail in accordance with the flowchart.

In step S1, the touch probes 6a, 6b are attached to the tip of the main-side spindle 41a and the tip of the sub-side spindle 41b. The touch probes 6a, 6b are held by the ATC units 200, 300 together with tools before attachment and automatically attached to the tips of the spindles 41a, 41b by operating the ATC units 200, 300.

In step S2, the spindle device 40a is moved in the X-axis direction and the Y-axis direction by the X-axis feed mechanism 52Dr and the Y-axis feed mechanism 70aDr so that the main-side spindle 41a comes to the position of the reference hole 9a formed on the main-side jig 8a, that is, the X coordinate and the Y coordinate of the spindle 41a coincide with the X coordinate and the Y coordinate of the reference hole 9a. FIG. 9 illustrates this state, and a center line Pa of the main-side spindle 41a is aligned with a center line Qa of the reference hole 9a of the main-side jig 8a.

In step S3, the main-side spindle device 40a and the sub-side spindle device 40b are moved forward in the Z-axis direction by a certain distance by the Z-axis feed mechanisms 80aDr, 80bDr, respectively. Accordingly, the touch probes 6a, 6b attached to the tips of the spindles 41a, 41b are introduced into the reference holes 9a, 9b, respectively.

In step S4, the positions (X and Y coordinates) of the reference holes 9a, 9b are measured by the touch probes 6a, 6b. Specifically, the touch probes 6a, 6b are brought into contact with a plurality of positions (e.g., four positions) on the inner walls of the reference holes 9a, 9b while moving the spindle devices 40a, 40b in the X-axis direction and the Y-axis direction, and the X coordinate and the Y coordinate of each of the center lines Qa, Qb of the reference holes 9a, 9b are obtained on the basis of the X coordinate and the Y coordinate of each of the contact positions. The X coordinate and the Y coordinate at this time are the position of each of the reference holes 9a, 9b, and this position is a reference position to be a reference for the correction of the spindle spacing.

In step S5, the spindle devices 40a, 40b are moved backward in the Z-axis direction by the Z-axis feed mechanisms 80aDr, 80bDr, respectively. Accordingly, the touch probes 6a, 6b come out of the reference holes 9a, 9b.

In step S6, the spacing between the reference holes 9a, 9b, that is, a reference hole spacing W1 of FIG. 9 is calculated on the basis of the positions of the reference holes 9a, 9b measured in step S4. As can be understood from FIG. 9, the reference hole spacing W1 can be calculated as the difference between the X coordinate of the center line Qa of the reference hole 9a and the X coordinate of the center line Qb of the reference hole 9b.

In step S7, the spacing between the spindles 41a, 41b, that is, a spindle spacing W2 of FIG. 9 is read from the storage unit 5b. Correction data of the reference hole spacing W1 and the spindle spacing W2 are stored in the storage unit 5b every time the correction is performed. Thus, the spindle spacing W2 read in step S7 is the spindle spacing that has been corrected last time.

As described at the beginning, a temperature change and heat during machining affect both the spindle side and the jig side. Thus, a displacement occurs not only in the spindle spacing W2, but also in the reference hole spacing W1. Therefore, the positions of the reference holes 9a, 9b are measured in the correction, and the preceding spindle spacing W2 is corrected again so as to align the spindles 41, 41b with the positions of the reference holes 9a, 9b (step S11 described below). Accordingly, even if a displacement occurs in the reference hole spacing W1, it is possible to maintain the relationship of W2=W1.

In step S8, a difference $\Delta W$ between the reference hole spacing W1 calculated in step S6 and the spindle spacing W2 read in step S7 is calculated ($\Delta W = W1 - W2$). The difference $\Delta W$ is a correction amount for correcting the spindle spacing W2.

In step S9, it is determined whether there is an error in the spindle spacing W2 on the basis of the difference $\Delta W$ calculated in step S8. Specifically, for example, it is determined that there is no error when $\Delta W = 0$ and determined that there is an error when $\Delta W \neq 0$. Alternatively, the difference $\Delta W$ may be compared with a predetermined threshold $\alpha$, and it may be determined that there is no error when $\Delta W < \alpha$ and determined that there is an error when $\Delta W \geq \alpha$.

When a result of the determination in step S9 shows that there is an error in the spindle spacing W2 (step S9: YES), the processing proceeds to step S10. When the result shows that there is no error in the spindle spacing W2 (step S9: NO), the processing is finished without executing step S10 and the following steps.

In step S10, the clamping devices 90 are brought into an unclamping state so as to release the coupling between the main-side first saddle 20a and the sub-side first saddle 20b. Accordingly, the sub-side first saddle 20b is detached from the main-side first saddle 20a and can independently move in the X-axis direction (right-left direction).

In step S11, the X-axis drive motor 55 of the sub-side X-axis feed mechanism 51Dr is rotated to move the entire machining unit 100B including the sub-side first saddle 20b in the X-axis direction by the correction amount ΔW calculated in step S8. As a result, in FIG. 9, the spindle 41b moves leftward by ΔW, so that the center line Pb of the spindle 41b is aligned with the center line Qb of the reference hole 9b. Accordingly, the spindle spacing W2 becomes equal to the reference hole spacing W1, and the correction of the spindle spacing W2 is completed.

In step S12, the clamping devices 90 are brought into a clamping state again to couple the main-side and sub-side first saddles 20a, 20b. At this time, the spindles 41a, 41b are in a reset state in which an error in the spindle spacing W2 is eliminated. Note that since the rigidity of the first saddles 20a, 20b is increased by coupling, the saddles are coupled after the completion of the correction as described above in the case of machining that requires the rigidity of the saddles. However, the coupling is not necessarily required. When the saddles require no rigidity, the clamping devices 90 may be maintained in an unclamping state after the completion of the correction, and the first saddles 20a, 20b may be synchronously moved by the X-axis drive motors 60, 55 of the X-axis moving mechanisms 52, 51, respectively.

After the correction of the spindle spacing is performed in this manner, the control device 5 transmits corrected position data (X and Y coordinates) of the spindles 41a, 41b to the ATC units 200, 300 because adjustment of tool change positions in the ATC units 200, 300 is also required with the correction of the spindle spacing. The ATC units 200, 300 drive motors (not illustrated) provided in the respective units on the basis of the position data to adjust the tool change positions of the tool holding members 202, 302. Accordingly, it is possible to accurately and promptly perform tool change with the spindles 41a, 41b.

The spindles 41a, 41b with the corrected spindle spacing W2 are moved to the tool change positions in the Y-axis direction and the Z-axis direction to replace the touch probes 6a, 6b attached to the tips of the spindles 41a, 41b with the tools 203, 303 which are required for machining of workpieces. At this time, in the ATC units 200, 300, the tool holding members 202, 302 which grasp the tools 203, 303 required for machining of the workpieces are moved to the tool change positions in the X-axis direction by the motors and the cam mechanisms (not illustrated). At this point, deviations between the spindles 41a, 41b and the tool change positions caused by the correction of the spindle spacing (the movement of the spindle devices 40a, 40b in the X-axis direction) are already eliminated by the adjustment of the tool change positions described above.

In one or more embodiments of the present invention, the tool change positions of the ATC units 200, 300 are substantially the center positions on the horizontal sides 201e, 301e of the frames 201, 301. Thus, even when the positions of the tool holding members 202, 302 located at the horizontal sides 201e, 301e are finely adjusted in the X-axis direction, the claw parts 204, 304 are maintained in an attitude perpendicular to the horizontal sides 201e, 301e. Therefore, the tool change is smoothly performed with the spindles 41a, 41b.

In FIG. 9, the main-side spindle 41a may be deviated from the reference hole 9a (the center lines Pa, Qa are not aligned with each other) at the time of starting measurement. However, the deviation is canceled by changing the position of the coordinate system in the machining program and thus does not affect the actual workpiece machining. Therefore, in the correction of the spindle spacing, it is not necessary to take a deviation of the main-side spindle 41a into consideration, and it is sufficient to simply correct only the spacing between the spindles 41a, 41b.

After the spindle spacing between the spindle devices 40a, 40b is corrected in the above manner, the main-side machining unit 100A and the sub-side machining unit 100B integrally move in the X-axis direction in machining workpieces. Thus, the spindle spacing is stably maintained, and machining can be performed on the workpieces with high accuracy.

Further, in the above embodiments, the X-axis moving mechanisms 52, 51 are provided corresponding to the machining units 100A, 100B, respectively. When the spindle spacing is corrected, the machining unit 100B is moved in the right-left direction (X-axis direction) together with the first saddle 20b by the X-axis drive motor 55 of the X-axis moving mechanism 51 to adjust the position of the spindle 41b. Further, the X-axis moving mechanism 51 operates not only during the correction of the spindle spacing, but also during normal workpiece machining. Thus, the correction of spindle spacing can be performed using the already-existing X-axis moving mechanism 51 without providing a dedicated device to correct the spindle spacing. Therefore, workpieces can be machined with high accuracy with a simple configuration. Further, it is not necessary to perform complicated fine adjustment by manpower, which brings large temporal and economic advantages.

Note that although, in the above embodiments, the sub-side machining unit 100B is moved by the X-axis moving mechanism 51 when the spindle spacing is corrected, the main-side machining unit 100A may be moved by the X-axis moving mechanism 52. Further, both the main-side and sub-side machining units 100A, 100B may be moved by both the X-axis moving mechanisms 51, 52.

The correction of the spindle spacing in the X-axis direction has been described above. In one or more embodiments of the present invention, corrections of the spindles 41a, 41b in the Y-axis direction and the Z-axis direction can also be easily performed. Hereinbelow, these corrections will be described.

As for the correction in the Y-axis direction, a deviation in the up-down direction of the spindles 41a, 41b between the machining units 100A, 100B can be corrected by moving the second saddles 30a, 30b in the up-down direction (Y-axis direction) by the main-side and sub-side Y-axis moving mechanisms 70a, 70b. As for the correction in the Z-axis direction, a deviation in the front-rear direction of the spindles 41a, 41b between the machining units 100A, 100B can be corrected by moving the main-side and sub-side Z-axis moving mechanisms 80a, 80b in the front-rear direction (Z-axis direction).

Thus, according to one or more embodiments of the present invention, it is possible to perform not only the position correction in the right-left direction of the spindles 41a, 41b, but also the position correction in the up-down direction and the position correction in the front-rear direction. As a result, the positions of the spindles 41a, 41b can be corrected with respect to all the three X, Y, Z axes by using the already-existing moving mechanisms of the respective axes.

In the machine tool of one or more embodiments of the present invention, the moving mechanisms of the respective X, Y, Z axes provided in the machining units 100A, 100B which are installed on the base part 11 are stacked in the order of X, Y, and Z from the lower side. That is, for example, in the machining unit 100A, when the first saddle 20a is moved in the right-left direction (X-axis direction) by the X-axis moving mechanism 52, the Y-axis moving mechanism 70a provided in the first saddle 20a also moves in the right-left direction, and, further, the Z-axis moving mechanism 80a provided in the second saddle 30a which is held by the first saddle 20a also moves in the right-left direction. That is, the moving mechanisms are stacked in the order of X, Y, and Z so that the movement of the first saddle 20a in the right-left direction caused by the X-axis moving mechanism 52 inevitably moves the Y-axis moving mechanism 70a in the right-left direction, and the movement of the Y-axis moving mechanism 70a in the right-left direction inevitably moves the Z-axis moving mechanism 80a in the right-left direction.

In comparison with the above, a case will be considered in which the moving mechanisms of the respective axes are stacked in the order of, for example, Y, X, and Z from the lower side. In this case, in order to correct the spacing between the two spindles 41a, 41b, for example, a center pillar member for installing a Y-axis guide rail is inevitably required between the right and left pillar members 12a, 12a of the column part 12 of one or more embodiments of the present invention, which increases the entire size of the machine. Further, also in the moving mechanism in the X-axis direction, the two machining units 100A, 100B are guided on the common X-axis guide rails 58, 53 in one or more embodiments of the present invention, while in the case of the stacked order of Y, X, and Z it is necessary to provide a guide rail for each of the machining units 100A, 100B.

On the other hand, when the moving mechanisms of the respective axes are stacked in the order of X, Y, and Z as in one or more embodiments of the present invention, it is not necessary to provide the center pillar member between the right and left pillar members 12a, 12a of the column part 12 and to provide the guide rail for each of the machining units 100A, 100B. Thus, the stacked order in one or more embodiments of the present invention largely contributes to downsizing of the machine even when the positions of the two spindles 41a, 41b are corrected in all the three-axis directions.

(13) Other Advantageous Effects

In the above embodiments, as illustrated in FIG. 2, the X-axis moving mechanism 52 corresponding to the first saddles 20a of the main-side machining unit 100A is disposed on the upper part of the column part 12, and the X-axis moving mechanism 51 corresponding to the first saddle 20b of the sub-side machining unit 100B is disposed on the upper face of the base part 11. Thus, in a state where the machining units 100A, 100B are coupled by the clamping devices 90, the entire machining units are stably supported by the X-axis moving mechanisms 52, 51 at the upper side and the lower side.

Further, in the above embodiments, the first saddle 20 is disposed on the upper face of the thin base rear part 14. Thus, the respective positions of the first saddle 20, the second saddle 30 which is supported by the first saddle 20, and the spindle device 40 which is supported by the second saddle 30 can be lowered. Therefore, the center of gravity of the entire machine is lowered, which increases the stability. Further, the square window 16 of the column part 12 has the vertical length equal to or longer than the vertical length of the vertically-elongated window 24 of the first saddle 20, and the square window 16 overlaps the vertically-elongated window 24. Thus, the position of the lowermost end of the spindle 41 is lowered. Therefore, even if there is no stool, it is possible to perform detachment/attachment of a workpiece, inspection of the tip of the spindle 41, and inspection of a tool. Further, since the first saddle 20 is disposed on the thin base rear part 14, the height of the entire machine is reduced, which can further downsize the machine together with the reduction in the depth described above. Moreover, although the machine becomes compact, the stroke of the spindle 41 in each of the X-axis direction, the Y-axis direction, and the Z-axis direction never becomes smaller than a conventional stroke.

Further, in the horizontal machining center 1 of one or more embodiments of the present invention, the X-axis guide rail 58 is disposed on the rear face of the upper beam member 12b of the column part 12, and the Y-axis guide rails 71 are disposed on the front faces of the pillar members 21, 21 of the first saddle 20. Thus, the X-axis guide mechanism 52G and the Y-axis guide mechanism 70G are located between the rear face of the upper beam member 12b of the column part 12 and the front face of the first saddle 20, and located on substantially the same plane (XY plane). This shortens a force transmission path to the jig base 190. Thus, accumulation of the amount of dimensional change in each component caused by thermal expansion is reduced, and the workpiece machining accuracy can be increased. Further, since the X-axis guide mechanism 52G and the Y-axis guide mechanism 70G are not separated in the front-rear direction, the machine can be downsized in the depth direction.

(14) Other Embodiments

The present invention can employ various embodiments as described below other than the above embodiments.

Figure 10:
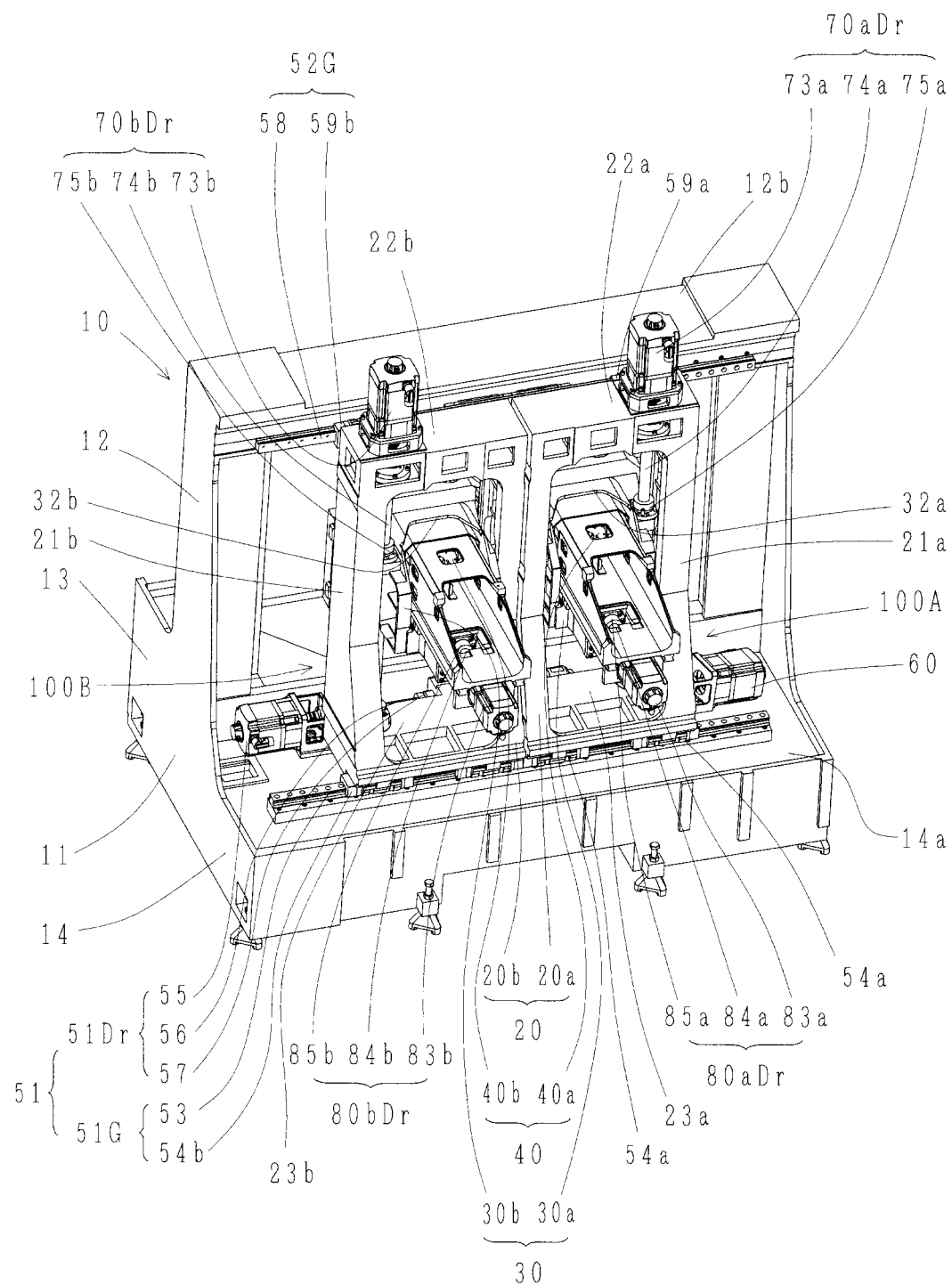
FIG. 10 is a perspective view of a horizontal machining center according to one or more embodiments of the present invention viewed from the rear side.
Figure 11:
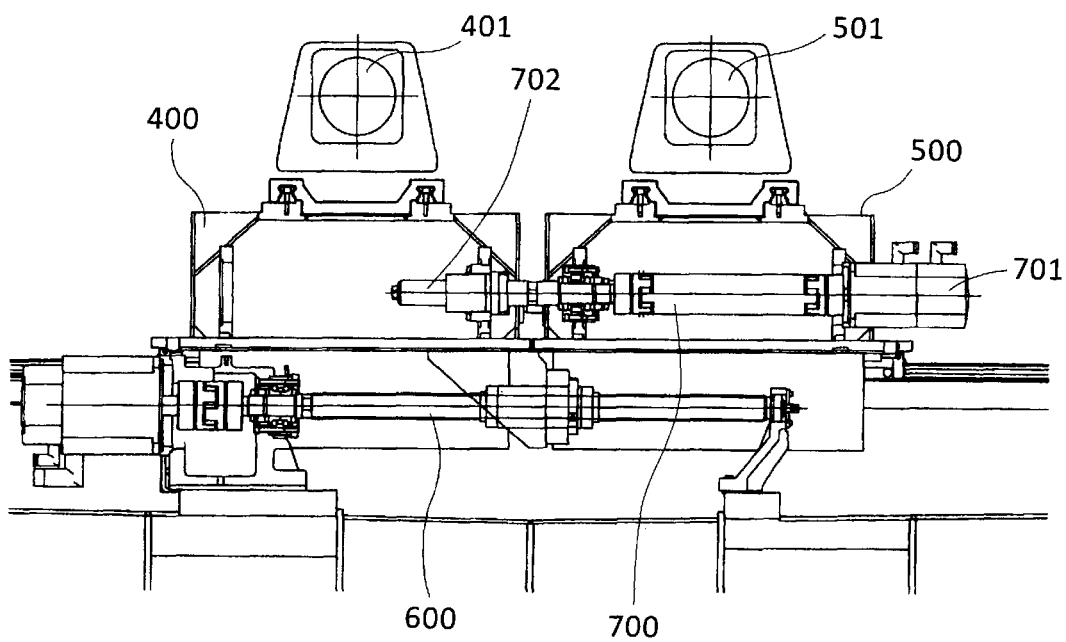
FIG. 11 is a diagram illustrating a conventional example.

FIG. 10 illustrates another embodiment of the horizontal machining center. FIG. 10 differs from FIG. 2 in that the main-side X-axis feed mechanism 52Dr in FIG. 2 is shifted to the upper face of the base part 11. In FIG. 10, only the drive motor 60 appears in the X-axis feed mechanism, and the ball screw 61 and the nut 62 of FIG. 2 do not appear. According to this embodiment, since the X-axis feed mechanism is not present on the upper face of the base column 10, it is possible to reduce the height of the machine by the elimination of the X-axis feed mechanism. Further, it is possible to easily install a tool magazine of the ATC unit on the upper face of the base column.

In the above embodiments, the touch probes 6a, 6b are used to measure the positions of the reference holes 9a, 9b. However, it is apparent that a sensor other than the touch probe may be used. Further, in the above embodiments, the reference holes 9a, 9b are formed on the jigs 8a, 8b. However, a reference hole may be formed on a member other than the jig. Moreover, the reference position is not limited to a hole. A groove or a projection may serve as the reference position.

In the above embodiments, the preceding spindle spacing W2 stored in the storage unit 5b is read in step S7 of FIG. 8. Alternatively, the positions of the spindles 41a, 41b may be measured simultaneously with the measurement of the positions of the reference holes 9a, 9b in step S4, and the spindle spacing W2 may be calculated from the measured positions.

In the above embodiments, there has been described an example in which the two spindles 41a, 41b perform the same machining on the same kind of workpieces. However, in the horizontal machining center 1 of one or more embodiments of the present invention, the two spindles 41a, 41b may perform different kinds of machining on different workpieces. In this case, each of the machining units 100A, 100B may be made independently movable without coupling the first saddles 20a, 20b, and the machining may be performed on each of the workpieces within a range in which the respective strokes in the X-axis direction of the first saddles 20a, 20b do not interfere with each other.

In the above embodiments, the machine tool provided with the two spindles 41a, 41b has been described as an example. However, the present invention can also be applied to a machine tool provided with three or more spindles in the similar manner as above.

In the above embodiments, the machining center has been described as an example of the machine tool. However, the present invention can also be applied to a machine tool other than a machining center.

REFERENCE SIGNS LIST

1: horizontal machining center (machine tool)
5: control device
6: reference position measuring device
6a, 6b: touch probe
9a, 9b: reference hole
20a, 20b: first saddle
30a, 30b: second saddle
40a, 40b: spindle device
41a, 41b: spindle
51, 52: X-axis moving mechanism
70: Y-axis moving mechanism
80: Z-axis moving mechanism
90: clamping device
100A, 100B: machining unit
200, 300: ATC unit (automatic tool changer)

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

The invention claimed is:

1. A machine tool comprising:
a plurality of machining units, each of the machining units comprising:
a first saddle movable in a right-left direction;
a second saddle supported by the first saddle and movable in an up-down direction;
a spindle device supported by the second saddle and movable in a front-rear direction, wherein the plurality of machining units are arranged in the right-left direction such that spindles provided in the respective spindle devices are parallel to each other;
an X-axis moving mechanism that comprises an X-axis drive motor and an X-axis guide rail, and guides the first saddle to move, using the X-axis drive motor, along the X-axis guide rail in the right-left direction;
a control device that controls an operation of the X-axis moving mechanism during machining of a workpiece and during correction of a spindle spacing between the machining units; and
a reference position measuring device that measures reference positions of jigs that correspond to the spindles of the machine units to correct the spindle spacing,
wherein a plurality of the X-axis moving mechanisms are provided corresponding to the respective machining units, and
the control device further:
calculates a reference position spacing W1 between a first reference position and a second reference position among the reference positions that correspond to a first jig and a second jig among the jigs;
calculates a spindle spacing W2 between the spindles of the machining units,
calculates a difference ΔW between the reference position spacing W1 and the spindle spacing W2, and
moves the first saddle of a predetermined one of the machining units in the right-left direction based on the difference ΔW, using one of the X-axis moving mechanisms corresponding to the predetermined machining unit, to correct the spindle spacing to make the spindle spacing W2 equal to the reference position spacing W1.

2. The machine tool according to claim 1, further comprising a clamping device that couples the first saddles of adjacent two of the machining units to each other,
wherein the control device brings the clamping device into an unclamping state to release the coupling between the first saddles during the correction of the spindle spacing, and
when the correction of the spindle spacing is finished, the control device brings the clamping device into a clamping state to couple the first saddles to each other or synchronously moves the first saddles using the X-axis moving mechanisms corresponding to the respective two machining units with the clamping device maintained in the unclamping state.

3. The machine tool according to claim 1, wherein the control device fixes the first saddle of one of adjacent two of the machining units so as not to move in the right-left direction and moves the first saddle of the other machining unit in the right-left direction to correct the spindle spacing.

4. The machine tool according to claim 1, further comprising:
a Y-axis moving mechanism that comprises a Y-axis drive motor and a Y-axis guide rail, and guides the second saddle of each of the machining units to move, using the Y-axis drive motor, along the Y-axis guide rail in the up-down direction; and
a Z-axis moving mechanism that comprises a Z-axis drive motor and a Z-axis guide rail, and guides the spindle device of each of the machining units to move, using the Z-axis drive motor, along the Z-axis guide rail in the front-rear direction,
wherein a plurality of the Y-axis moving mechanisms and a plurality of the Z-axis moving mechanisms are provided corresponding to the respective machining units, and
the control device moves the second saddle in the up-down direction using the Y-axis moving mechanism to correct a deviation in the up-down direction of the spindles between the machining units and moves the spindle device in the front-rear direction using the Z-axis moving mechanism to correct a deviation in the front-rear direction of the spindles between the machining units.

5. The machine tool according to claim 1, further comprising an automatic tool changer that changes a tool attached to the spindle of each of the machining units,
wherein the control device transmits corrected position data of the spindle to the automatic tool changer.

6. The machine tool according to claim 5,
wherein the automatic tool changer includes a frame that houses a tool therein, and
the frame includes a horizontal side facing the spindle.

* * * * *